(12) United States Patent
Karpenko et al.

(10) Patent No.: US 12,429,108 B2
(45) Date of Patent: Sep. 30, 2025

(54) WIRE ROPE VIBRATION DAMPING

(71) Applicant: FORD GLOBAL TECHNOLOGIES, LLC, Dearborn, MI (US)

(72) Inventors: Yuri Anatoly Karpenko, Brighton, MI (US); Avik Banerjee, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

(21) Appl. No.: 18/108,133

(22) Filed: Feb. 10, 2023

(65) Prior Publication Data

US 2024/0271681 A1 Aug. 15, 2024

(51) Int. Cl.
*F16F 7/08* (2006.01)
*F16F 15/02* (2006.01)

(52) U.S. Cl.
CPC .......... *F16F 15/02* (2013.01); *F16F 2224/02* (2013.01)

(58) Field of Classification Search
CPC .......... F16F 15/02; F16F 7/08; F16F 2224/02; F16F 2222/04; B60G 2204/41
See application file for complete search history.

(56) References Cited

U.S. PATENT DOCUMENTS

| | | | | |
|---|---|---|---|---|
| 2,828,934 | A * | 4/1958 | Markowski | F16F 13/02 267/140.11 |
| 3,286,799 | A * | 11/1966 | Shilton | F16D 65/12 188/218 R |
| 5,062,618 | A * | 11/1991 | Yamada | F16F 1/371 267/140.4 |
| 5,704,271 | A | 1/1998 | Ikeda | |
| 7,213,499 | B2 | 5/2007 | Strehler | |
| 8,602,184 | B2 * | 12/2013 | Tamura | F16F 7/08 188/380 |
| 8,807,304 | B2 * | 8/2014 | Amano | F16F 7/08 188/378 |
| 10,352,394 | B2 * | 7/2019 | Karpenko | F16F 3/12 |
| 10,495,175 | B2 * | 12/2019 | Karpenko | B29C 45/14549 |
| 10,808,747 | B2 * | 10/2020 | Karpenko | F16B 5/0241 |
| 11,835,105 | B2 * | 12/2023 | Karpenko | F16F 1/366 |
| 2005/0039992 | A1 * | 2/2005 | Hurwic | F16D 65/0006 188/73.35 |
| 2010/0314210 | A1 * | 12/2010 | Amano | F16F 7/08 188/381 |

(Continued)

FOREIGN PATENT DOCUMENTS

| CN | 110914121 A | 3/2020 |
|---|---|---|
| CN | 217496269 U | 9/2022 |

(Continued)

*Primary Examiner* — Thomas W Irvin
(74) *Attorney, Agent, or Firm* — Burr & Forman; Lorne Forsythe

(57) ABSTRACT

An interface plate for operably coupling a vehicle component to a chassis of the vehicle may include a first surface adapted to be operably coupled to an actuator housing, a second surface adapted to be operably coupled to the chassis, and a vibration reduction assembly to reduce vibration propagation between the actuator housing and the chassis. The vibration reduction assembly may include a first retaining channel disposed in the first surface, and a first wire rope disposed within the first retaining channel.

18 Claims, 7 Drawing Sheets

(56) References Cited

U.S. PATENT DOCUMENTS

| | | | | |
|---|---|---|---|---|
| 2011/0132706 A1* | 6/2011 | Tamura | .................... | F16F 7/08 |
| | | | | 188/381 |
| 2014/0021665 A1* | 1/2014 | Han | ...................... | F16F 7/00 |
| | | | | 267/140.3 |
| 2016/0097433 A1* | 4/2016 | Karpenko | ............. | F16D 65/092 |
| | | | | 164/112 |
| 2016/0341269 A1* | 11/2016 | Karpenko | ............... | B22D 19/00 |
| 2018/0245573 A1 | 8/2018 | Maruo et al. | | |
| 2018/0274624 A1* | 9/2018 | Karpenko | ............... | F16F 13/04 |
| 2019/0048958 A1* | 2/2019 | Karpenko | ......... | B29C 45/14549 |
| 2021/0293296 A1* | 9/2021 | Karpenko | ................ | F16F 7/02 |
| 2024/0384768 A1* | 11/2024 | Karpenko | ............... | F16D 65/12 |

FOREIGN PATENT DOCUMENTS

| | | |
|---|---|---|
| JP | H09188241 A | 7/1997 |
| JP | 2022119280 A | 8/2022 |
| WO | 8900939 A1 | 2/1989 |

* cited by examiner

WIRE ROPE VIBRATION DAMPING

TECHNICAL FIELD

Example embodiments generally relate to the reduction of vehicle noise, vibration and harshness (NVH) and, more particularly, relate to a dampener for minimizing vibrations in a vehicle.

BACKGROUND

One of the challenges to overcome when designing and manufacturing vehicles may be the optimization of noise, vibration, and harshness (NVH) characteristics. In some cases, NVH may refer to noises and vibrations perceived by the operator of the vehicle and its other occupants from within the cabin during operation. In many cases, any given component of the vehicle may negatively contribute to NVH levels by vibrating or otherwise creating unwanted noise, and thus new solutions for reducing the NVH levels in the vehicle are always being developed.

Vehicles commonly include components that may be in functional and/or physical connection with other components. The connection of such components may be a source of unwanted NVH levels within the cabin. For example, in some cases the physical connection of two rigid components may transmit vibrations through said components and into the cabin of the vehicle. Accordingly, there may be a desire to find and mitigate component connections that contribute to increased NVH levels in the vehicle.

BRIEF SUMMARY OF SOME EXAMPLES

In accordance with an example embodiment, an interface plate for operably coupling a vehicle component to a chassis of the vehicle may be provided. The interface plate may include a first surface adapted to be operably coupled to an actuator housing, a second surface adapted to be operably coupled to the chassis, and a vibration reduction assembly to reduce vibration propagation between the actuator housing and the chassis. The vibration reduction assembly may include a first retaining channel disposed in the first surface, and a first wire rope disposed within the first retaining channel.

In another example embodiment, a vibration reduction assembly may be provided. The vibration reduction assembly may include a first wire rope disposed in a first retaining channel, and a second wire rope disposed in a second retaining channel. The first and second wire ropes may include strands. The strands may dissipate vibrations through friction damping.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
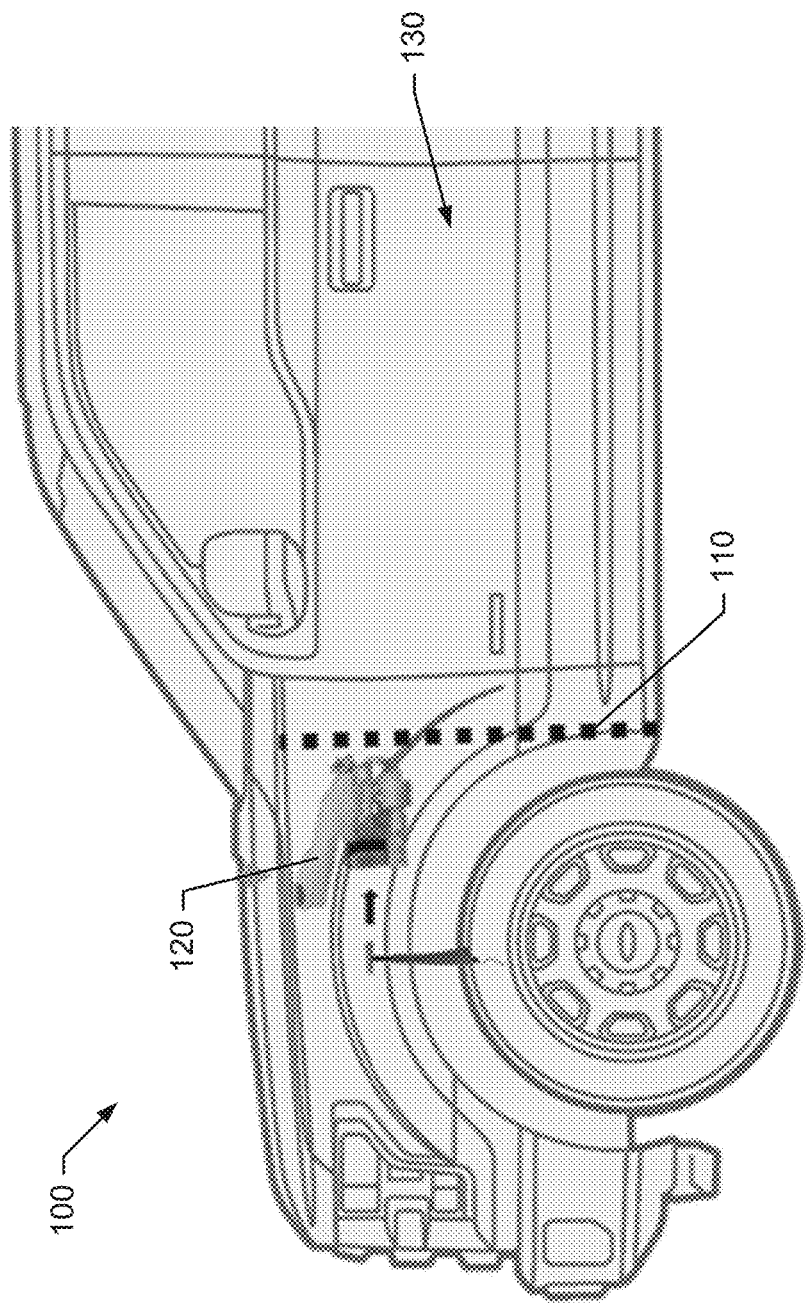
FIG. 1 illustrates a schematic view of a vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some embodiments may provide a vibration reduction assembly that may integrate easily into existing components in the vehicle and couplings between said components in the vehicle. In this regard, for example, some embodiments may provide for an interface plate which may include a vibration reduction assembly. The vibration reduction assembly may include wire ropes disposed at the interface plate between a given component of the vehicle and the chassis of the vehicle. Due to the vibration reduction assembly, vibrations traveling between components and the vehicle chassis may be reduced and overall NVH levels in the vehicle may be improved.

FIG. 1 illustrates a schematic view of a vehicle 100. In some embodiments, the vehicle 100 may include a chassis 110 which may be integrated into, or operably coupled to, the body of the vehicle 100. For the extent of the contexts described herein, the chassis 110 of the vehicle 100 may broadly refer to the structure of the vehicle 100. In this regard, if a component of the vehicle 100 is operably coupled to the chassis 110, it may be operably coupled to the structure of the vehicle 100, which may include, but not be limited to, the body, the frame, or perhaps another assembly physically operably coupled to other structural members of the vehicle 100. Thus, the chassis 110 may have a plurality of components operably coupled thereto. One such component operably coupled to the chassis 110, highlighted in FIG. 1, may be an electronic brake booster (EBB) 120. In an example embodiment, the EBB 120 may be physically operably coupled to the chassis 110 via a dash assembly within the body 130 of the vehicle. In some cases, the EBB 120 may include or otherwise be operably coupled to an actuator, or a brake pedal, configured to be actuated by an operator of the vehicle 100. In this regard, the EBB 120 may amplify the force applied to the actuator by the operator into an appropriate braking force that gets applied to a brake assembly of the vehicle 100 in order to effectively slow the vehicle 100 in a controlled manner. In other words, the operator may first apply a force to the brake pedal, often via the operator's foot. The force on the brake pedal, which may be directly operably coupled to the housing of the EBB 120 in some embodiments, may signal to the EBB 120 to increase the pressure of the force applied to the brake pedal, and apply it to the actual brakes of the vehicle 100. In order to do so, the EBB 120 may contain a pump within a housing of the EBB 120 so that the EBB 120 can amplify the force on the brake assembly to be greater than the force that the operator applied to the brake pedal. Accordingly, the vibration reduction assembly 140 (see FIG. 2) discussed below, which may be used to reduce the propagation of vibrations between the EBB 120 and the chassis 110, may also be applied to other vehicle components separate from the EBB 120 in order to reduce the propagation of vibrations between those respective components and the rest of the vehicle 100.

In some embodiments, responsive to the brake pedal receiving a force from the operator, the motor drive unit of the pump within the EBB 120, as well as other internal components of the EBB 120, may be activated inn order to build up the pressure in the brake assembly appropriately. In doing so, the EBB 120 itself may emit vibrations from the housing of the EBB 120 while the EBB 120 works to build up the pressure to the brake assembly. In some cases, the vibrations may propagate throughout the vehicle 100 through the physical operable coupling of the EBB 120 with the chassis 110, via the dash assembly, at a frequency within the range of 100-2000 Hz. In such cases, the operator of the vehicle 100 may perceive abnormal NVH levels throughout the vehicle 100 responsive to applying a force to the brake pedal to decelerate the vehicle 100. Occasionally, the NVH levels may be more noticeable due to there being less ambient noise from the vehicle 100 such as, for example, where the vehicle 100 may be an electric vehicle. In any case, a vibration reduction assembly 140 may be operably coupled to the EBB 120 to reduce the propagation of vibrations throughout the vehicle 100.

Figure 2:
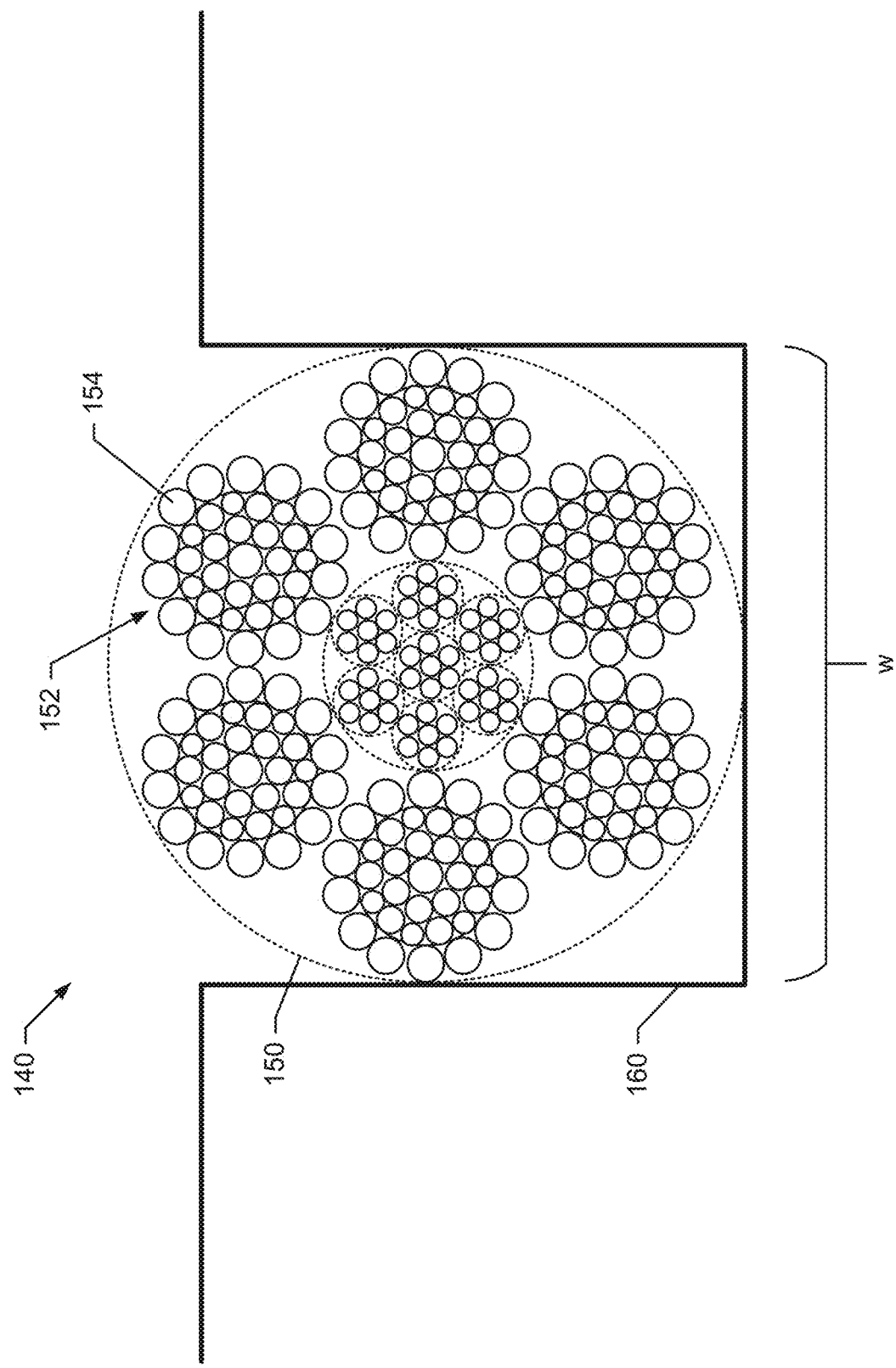
FIG. 2 illustrates a close up cross section view of the vibration reduction assembly in accordance with an example embodiment.

FIG. 2 illustrates a close up cross section view of the vibration reduction assembly 140. As shown in FIG. 2, the vibration reduction assembly 140 may include wire rope 150 and a retaining channel 160. In this regard, the wire rope 150 may be disposed within the retaining channel 160, which may be formed to accommodate the size of the wire rope 150. In other words, the retaining channel 160 may have a width (w) that may be approximately equal to an outer diameter of the wire rope 150 so that the wire rope 150 may lay within the retaining channel 160 without excess room for the wire rope 150 to move relative to the retaining channel 160. The retaining channel 160 may be implemented in a variety of different manners that may reflect different physical structures as well. In this regard, according to an example embodiment, the retaining channel 160 may be cut into the vibration reduction assembly 140 using any suitable means for cutting the vibration reduction assembly 140 such as a mill, a lathe, a laser, a water blaster, or any other appropriate cutting mechanism. In some cases, the retaining channel 160 may be formed by raising portions of the vibration reduction assembly 140 to create a corrugated pattern on the vibration reduction assembly 140. In this regard, the wire rope 150 may lay within the corrugated surface of the vibration reduction assembly 140 accordingly. In still other cases, the retaining channel 160 may be formed from adding material to the vibration reduction assembly to function as walls on either side of the retaining channel 160 and hold the wire rope 150 there between as a result. In some cases, the retaining channel 160 may even be defined by a series of hooks disposed on the surface of the vibration reduction assembly 140 for containing the wire rope 150 in a specific layout. In this regard, the retaining channel 160 may be defined as the region between consecutive hooks. In some example embodiments, the gauge, or the outer diameter, of the wire rope 150 may be selected for the optimization of various characteristics of the vibration damping. In such cases where a wire rope 150 with a larger gauge is required, the retaining channel 160 may accordingly be made larger to accommodate the wire rope 150. The wire rope 150 may be fixed to the retaining channel 160 at respective ends of the retaining channel 160 by a means for securing a wire rope 150 to a solid surface. However, in some cases, friction alone may retain the wire rope 150 in the retaining channel 160.

In some embodiments, such as the one shown in FIG. 2, the wire rope 150 may include a plurality of strands 152 made up of individual wires 154 that, together, make up the wire rope 150 as a whole. The strands 152 may include wires 154 of different diameters for the various different locations where the wires 154 may be disposed at within the strands 152, and for where the strands 152 may be disposed at within the wire rope 150. In some cases, such as the embodiment depicted in FIG. 2, the center of the cross section, or the core of the wire rope 150, may contain strands 152 that are made up of wires 154 having a smaller diameter than the wires 154 in the strands 152 disposed at the perimeter of the cross section of the wire rope 150. In an example embodiment, the smaller diameter wires 154 may allow for the core of the wire rope 150 to be more densely packed than the perimeter of the wire rope 150, which may give the wire rope 150 more favorable structural properties with a more rigid core than perimeter. In other cases, many of the wires 154 may have substantially the same diameter, while still being bound in a similar cross section pattern.

In an example embodiment, the vibration reduction assembly 140 pictured in FIG. 2 may dampen vibrations through friction damping. In this regard, the vibration reduction assembly 140 may be subjected to vibrations through a physical operable coupling with a source of vibrations. The wire rope 150 may thus vibrate as a result of being physically operably coupled to the retaining channel 160 at respective ends, and therefore the wires 154 and strands 152 that make up the wire rope 150 may absorb and dampen such vibration by moving relative to one another. As the wires 154 and strands 152 that make up the wire rope 150 move relative to one another, they may rub against other wires 154 and strands 152 within close proximity, and may therefore generate friction between other strands 152 and wires 154 as a result. The friction between the wires 154 and strands 152 of the wire rope 150 may help to dissipate the energy put into the wire rope 150 from the vibrations by converting the vibration energy into heat and motion, among other forms of energy. The result may be that the wire rope 150 may dissipate vibration energy in this regard through friction damping. Thus, the vibration energy generated by the EBB 120 may be reduced before being able to propagate to the chassis 110 as a result of passing through the wire rope 150 of the vibration reduction assembly 140.

Figure 3B:
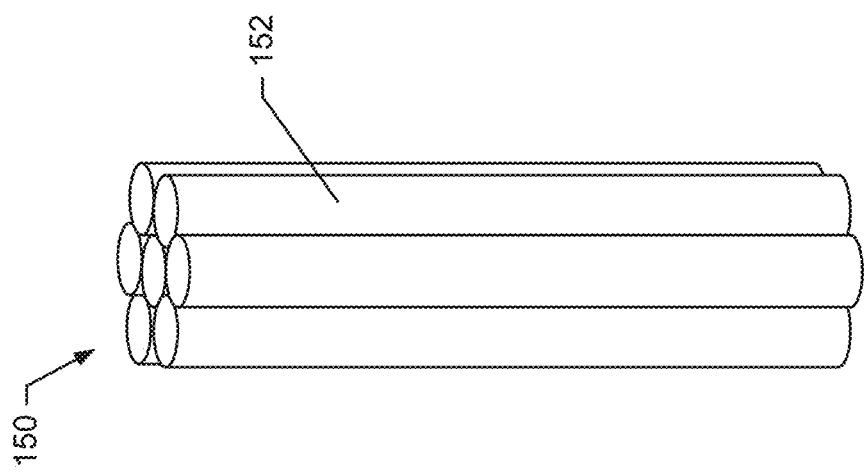
FIG. 3B illustrates the wire rope according to an example embodiment.
Figure 3A:
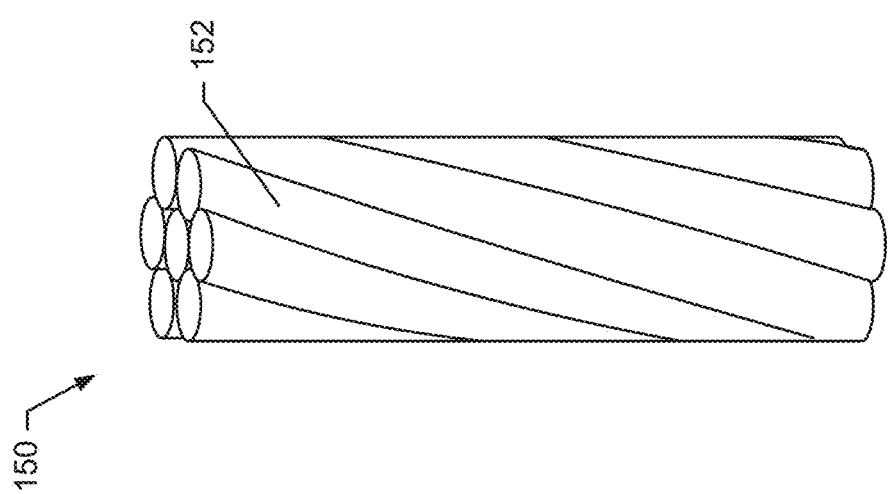
FIG. 3A illustrates the wire rope according to an example embodiment.

As shown in FIGS. 3A and 3B, the strands 152 of the wire rope 150 may be bound together in various different configurations. While FIGS. 3A and 3B depict just two of said configurations, it should however be appreciated that other configurations may also be possible, and the wire rope 150 may not necessarily be limited in its construction to those embodiments shown in FIGS. 3A and 3B. Nevertheless, the wire rope 150 of the vibration reduction assembly 140 in some embodiments may be bound together in a twisted configuration (FIG. 3A), and in other embodiments may be bound together in a parallel configuration (FIG. 3B). The binding configuration and the gauge of the wire rope 150, among other characteristics, may be selected based on parameters of the specific application of the vibration reduction assembly 140, including but not limited to the frequency of the vibrations and the amount of space there is to form the retaining channel 160 within the surface material.

Figure 4:
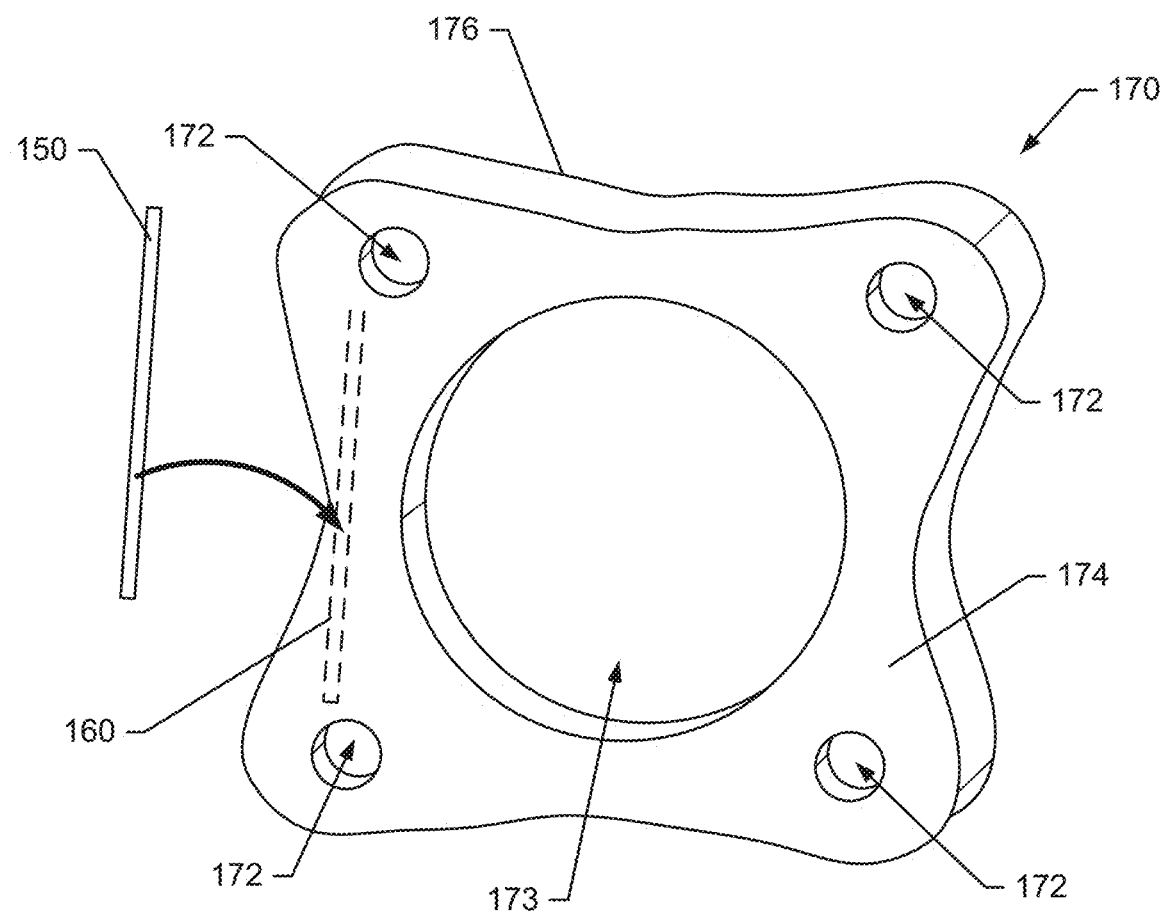
FIG. 4 illustrates a perspective view of an interface plate including the vibration reduction assembly according to an example embodiment.

FIG. 4 illustrates a perspective view of an interface plate 170 including the vibration reduction assembly 140. In this regard, the interface plate 170 may be a separate component within the vehicle 100 that may be disposed at the interface of a vibration-inducing component, such as the EBB 120, and the chassis 110 of the vehicle 100. The interface plate 170 may include at least one fastener orifice 172 and at least one component orifice 173. The fastener orifice 172 may allow passage of a fastener from the EBB 120, through the interface plate, and to the chassis 110 in order to operably couple the EBB 120 to the dash assembly of the vehicle 100, which may be considered a part of the chassis 110, with the interface plate 170 disposed in between. In some embodiments, the interface plate 170 may include a plurality of fastener orifices 172. Similarly, the component orifice 173 may allow passage of any interacting portions of the EBB 120 and the chassis 110 through the interface plate 170 so that such portions may maintain their interaction following the installation of the interface plate 170. Also, for example, in some use cases of the interface plate 170 with other components besides the EBB 120, the component may utilize electrical wires to transmit data from one component to another disposed at a portion of the chassis 110. Thus the data wires may also pass through the component orifice 173 in the interface plate 170. In some embodiments, the interface plate 170 may include a plurality of component orifices 173. In any case, the interface plate 170 may be installed without needing to remove any pre-existing sealing gaskets between the EBB 120 and the dash assembly that may prevent dust and other debris from entering the EBB 120 accordingly.

In an example embodiment, the interface plate 170 may include a first surface 174 and a second surface 176. The first and second surfaces (174, 176) may in some embodiments be planar and parallel to each other, separated by a depth of the interface plate 170. In an example embodiment, the depth of the interface plate 170 may be within a range of 0.5 mm to 1 mm, but in other example embodiments the depth of the interface plate 170 may be smaller or larger depending on the size requirements of the specific application of the interface plate 170. In some cases, the first surface 174 may be in direct contact with the EBB 120 housing, and the second surface 176 may be in direct contact with the chassis 110. In this regard, the interface plate 170 may form the physical connection of the operable coupling between the EBB 120 and the chassis 110. As such, any vibrations propagating from the EBB 120 to the chassis 110 must propagate through the interface plate 170. Accordingly, in some embodiments, the vibration reduction assembly 140 may be disposed on the interface plate 170. In some cases, the retaining channel 160 may be formed into the first surface 174, as depicted in FIG. 4, so that the wire rope 150 may maintain physical contact with the EBB 120 or other component operably coupled to the interface plate 170 while disposed in the retaining channel 160. In another example embodiment, the retaining channel 160 may be formed into the second surface 176 so that the wire rope 150 may maintain physical contact with the chassis 110 operably coupled to the interface plate 170 while disposed in the retaining channel 160. Of note, the dimensions of the interface plate 170 should not be seen as limiting. The shape and size of the interface plate 170 described herein may be appropriately created for the specific application of the interface plate 170.

Figure 5:
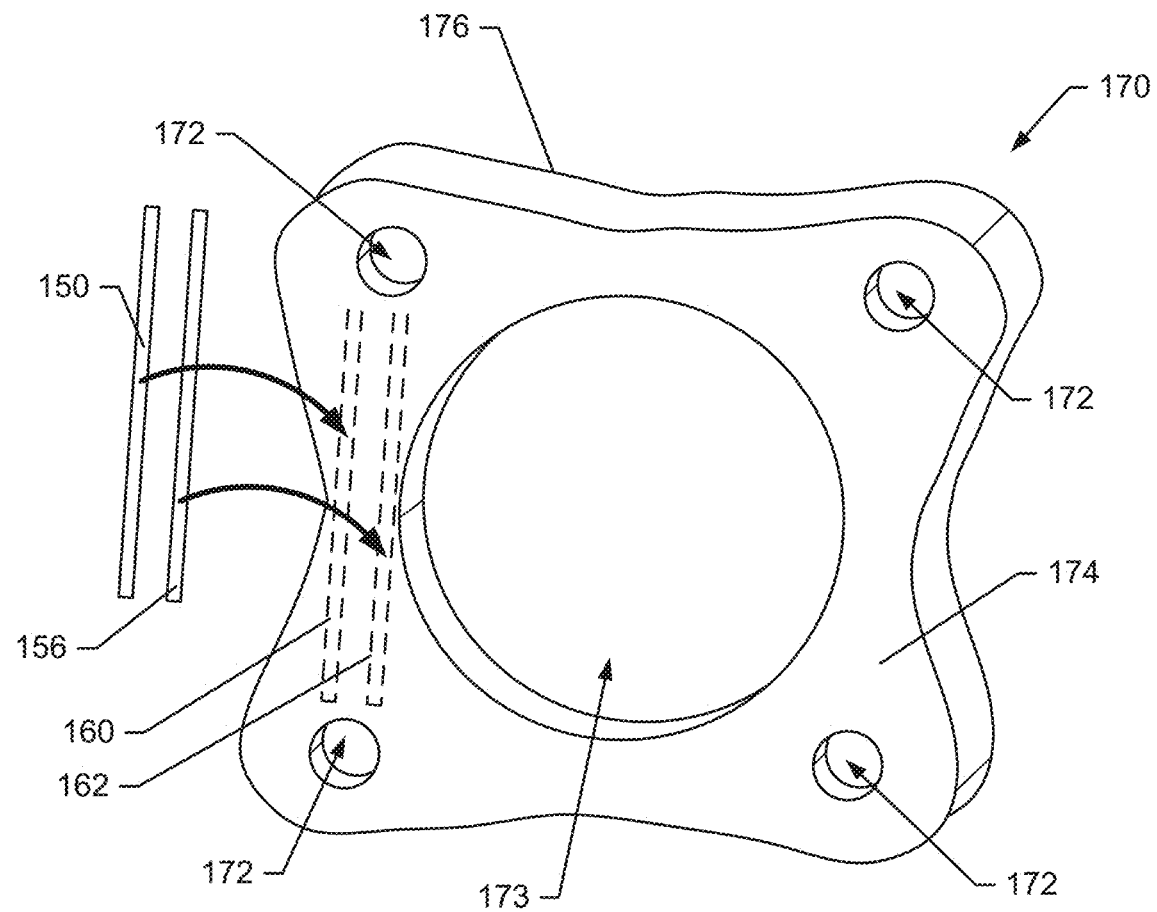
FIG. 5 illustrates a perspective view of an interface plate including the vibration reduction assembly according to an example embodiment.

As shown in FIG. 5, in some embodiments, the vibration reduction assembly 140 may include a first retaining channel 160, a second retaining channel 162, a first wire rope 150 and a second wire rope 156. Similar to the vibration reduction assembly 140 with a single retaining channel 160, the first and second retaining channels (160, 162) may be disposed in any number of different configurations on either of the first or second surfaces (174, 176) of the interface plate 170. In the example embodiment depicted in FIG. 5, the first and second retaining channels (160, 162) may both be disposed proximate to one another and extend parallel to each other. In other words, the first retaining channel 160 may be proximate to an outer edge of the first surface 174 of the interface plate 170 and the second retaining channel 162 may be disposed proximate to the component orifice 173 at an inner edge of the interface plate 170.

Figure 6:
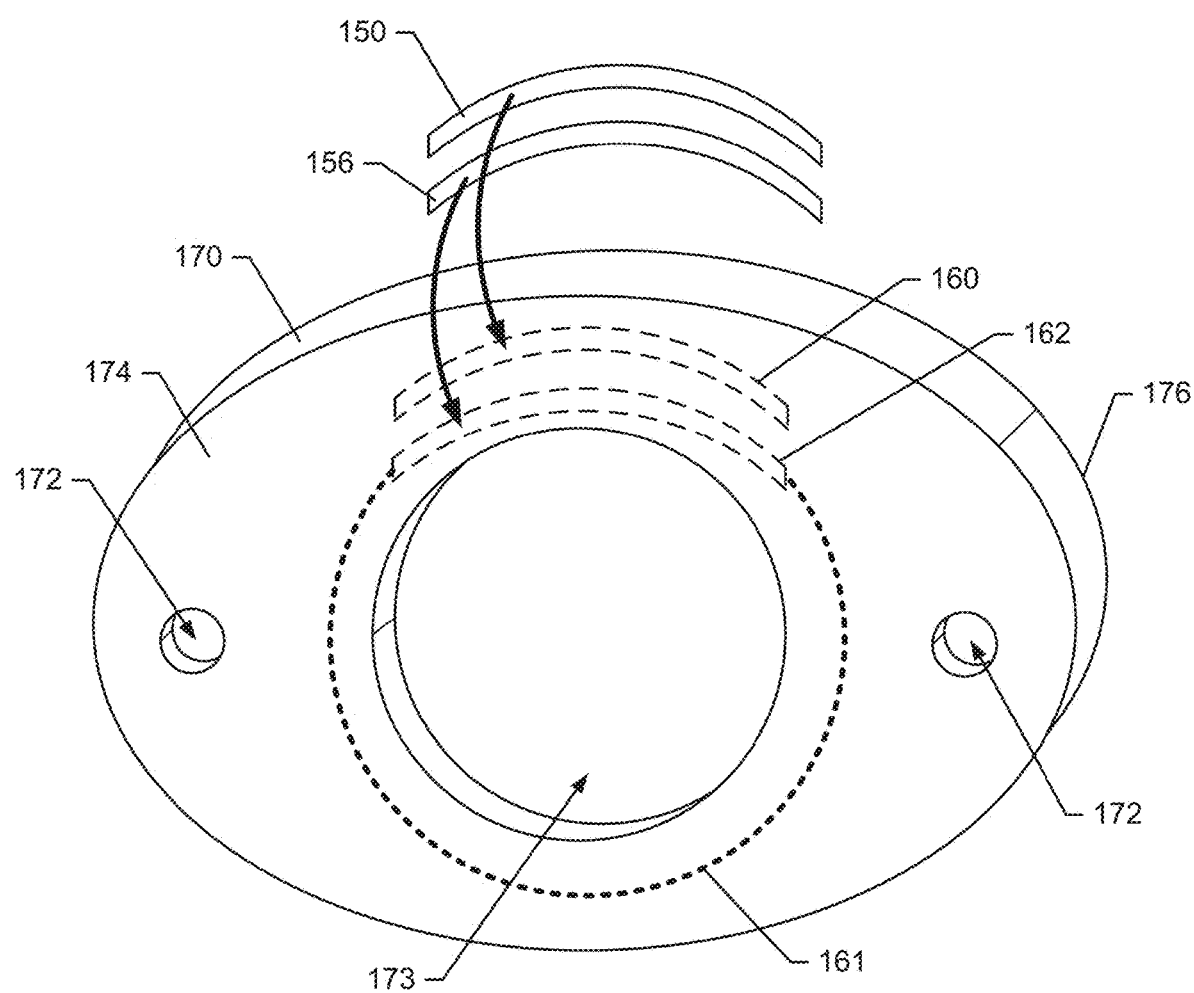
FIG. 6 illustrates a perspective view of an interface plate including the vibration reduction assembly according to an example embodiment.

FIG. 6 illustrates an interface plate 170 according to an example embodiment. In the embodiment of FIG. 6, the interface plate 170 may be substantially rounded, perhaps to improve the fitment of the interface plate 170 into a specific application. In such cases, the vibration reduction assembly 140 may be implemented with arcuate first and second retaining channels (160, 162) and arcuate first and second wire ropes (150, 156). In the embodiment depicted in FIG. 6, however, the first and second retaining channels (160, 162), while arcuate, may also be parallel (or equidistant) to one another. Also shown in FIG. 6, in some embodiments, the first and/or second retaining channels (160, 162) may extend entirely around the component orifice 173, as indicated by dotted line 161, with an extended, continuous, first and/or second wire rope (150, 156) disposed therein.

In some embodiments, the vibration reduction assembly 140 may be incorporated into the EBB 120 housing or the chassis 110 itself, rather than on a separate part such as the interface plate 170. In this regard, the EBB 120 may operably couple to the chassis 110 at an end of the EBB 120 housing via one or more fasteners. The vibration reduction assembly 140 may therefore be disposed at the portion of the EBB 120 where the EBB 120 and the chassis 110 may make physical contact without the interface plate 170 therebetween. Accordingly, the vibration reduction assembly 140 may be more easily mass produced by reducing the time and resources needed to manufacture the vibration reduction assembly 140 on a separate component such as the interface plate 170.

When implementing the vibration reduction assembly 140 at the portion of the EBB 120 where the EBB 120 and the chassis 110 may make physical contact, the structural integrity of the interface between the EBB 120 and the chassis 110 should be maintained responsive to the addition of the interface plate 170 therein. Accordingly, the structural integrity of the interface may be maintained by limiting the amount of compressive load applied to the wire rope 150. Since the wire rope 150 may introduce friction damping into the interface, the interface may naturally "settle" which may lead to the load on the joint being relaxed slightly. However, preventing the load on the joint from relaxing may be helpful in maintaining the structural integrity of the interface between the EBB 120 and the chassis 110.

Thus, to prevent the load on the joint from relaxing too much, the amount of compression of the wire rope 150 inside the retaining channel 160 may be limited. The compression of the wire rope 150 may be limited by intentionally machining the retaining channel 160 to have a volume larger than that of the wire rope 150 by a range of approximately 10% to 20%. In this regard, the larger volume of the retaining channel 160 may allow for the compression of the wire rope 150 inside the retaining channel 160 responsive to an outer surface of the wire rope 150 being subjected to the loading on the joint. With the wire rope 150 compressed inside the retaining channel 160, the load on the joint at the interface plate 170 may mainly be distributed across the outer surface areas of the interface plate 170 formed by the tips or summits of the retaining channel 160. For instance, if the wire rope 150 were to have a radius of approximately 2 mm, the retaining channel 160 may have a depth of 3.7 mm and a width of 4 mm. As such, the difference between the volume of the wire rope 150 and the retaining channel 160 may ensure that under dynamic excitation, the inter-wire friction may attenuate vibration input of the EBB 120 into the vehicle dash panel (i.e. the chassis 110).

Figure 7:
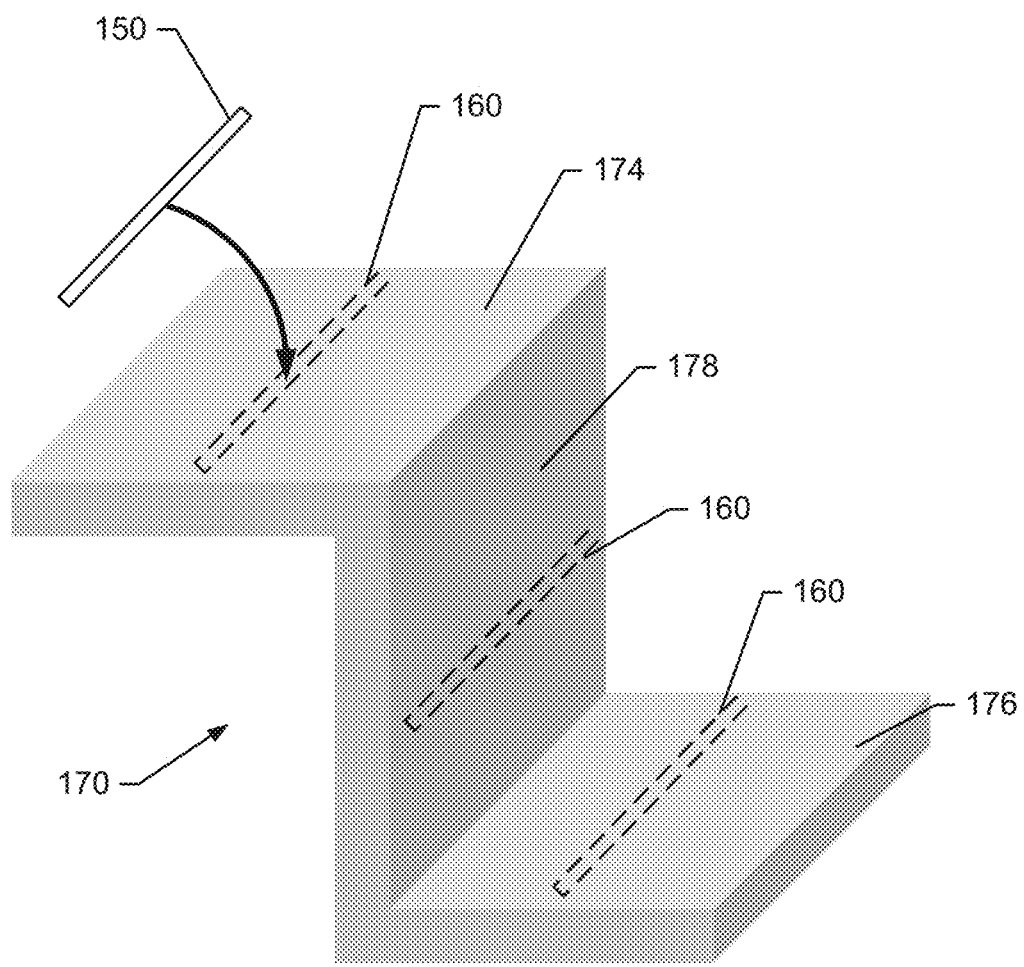
FIG. 7 illustrates a perspective view of an interface plate including the vibration reduction assembly according to an example embodiment.

FIG. 7 illustrates an interface plate 170 according to an example embodiment. In the embodiment depicted in FIG. 7, the interface plate 170 may be shaped substantially like a "Z bracket" in which the first surface 174 and the second surface 176 are parallel to one another and separated from each other by a third surface 178 that extends perpendicularly between the first and second surfaces (174, 176). In such cases, the vibration reduction assembly 140 may be disposed at any of the first, second or third surfaces (174, 176, 178). An interface plate 170 such as the one depicted in FIG. 7 may, for example, be needed where the components being operably coupled together cannot be made to be closer without substantial time and effort spend redesigning the layout of the components. In any case, the interface plate 170 may operate substantially the same where the first surface 174 may operably couple to a first component (i.e. an EBB 120) and the second surface 176 may operable couple to a second component (i.e. the chassis 110).

An interface plate for operably coupling a vehicle component to a chassis of the vehicle may therefore be provided. The interface plate may include a first surface that may be adapted to be operably coupled to an actuator housing, a second surface that may be adapted to be operably coupled to the chassis, and a vibration reduction assembly to reduce vibration propagation between the actuator housing and the chassis. The vibration reduction assembly may include a first retaining channel disposed in the first surface, and a first wire rope disposed within the first retaining channel.

The interface plate of some embodiments may include additional features, modifications, augmentations and/or the like to achieve further objectives or enhance performance of the interface plate. The additional features, modifications, augmentations and/or the like may be added in any combination with each other. Below is a list of various additional features, modifications, and augmentations that can each be added individually or in any combination with each other. For example, a second retaining channel may be disposed in the first surface. In an example embodiment, a second wire rope may be disposed within the second retaining channel. In some cases, the second wire rope may include strands. In an example embodiment, the first and second retaining channels may be linear in shape and parallel to each other. In some cases, the first and second retaining channels may be arcuate in shape and equidistant from each other. In an example embodiment, the interface plate may further include a component orifice that may extend through the interface plate from the first surface to the second surface. In some cases, the first retaining channel may be disposed proximate to an outer edge of the first surface of the interface plate and the second retaining channel may be disposed proximate to the component orifice at an inner edge of the interface plate. In an example embodiment, the first retaining channel may have a width approximately equal to a diameter of the first wire rope. In some cases, the strands of the first wire rope may be bound together in a parallel configuration. In an example embodiment, the strands in the first wire rope may be bound together in a twisted configuration. In some cases, the actuator housing may be an electronic brake boost housing. In an example embodiment, the interface plate may be integrally formed on an end of the electronic brake boost housing. In some cases, the interface plate may be a separate component operably coupled to the electronic brake boost housing and the chassis at an interface between the electronic brake boost housing and the chassis.

A vibration reduction assembly may therefore be provided. The vibration reduction assembly may include a first wire rope disposed in a first retaining channel, and a second wire rope disposed in a second retaining channel. The first and second wire ropes may include strands. The strands may dissipate vibrations through friction damping.

The vibration reduction assembly of some embodiments may include additional features, modifications, augmentations and/or the like to achieve further objectives or enhance performance of the interface plate. The additional features, modifications, augmentations and/or the like may be added in any combination with each other. Below is a list of various additional features, modifications, and augmentations that can each be added individually or in any combination with each other. For example, the first and second retaining channels may each have a width approximately equal to a diameter of the first and second wire ropes, respectively. In an example embodiment, the first and second retaining channels may be linear in shape and parallel to each other. In some cases, the first and second retaining channels may be arcuate in shape and equidistant from each other. In an example embodiment, the strands of the first and second wire ropes may be bound together in a parallel configuration. In some cases, the strands in the first and second wire ropes may be bound together in a twisted configuration. In an example embodiment, the first and second wire ropes may be disposed between an actuator and a chassis of a vehicle to reduce the propagation of vibrations between the chassis and the actuator. In some cases, the vibration reduction assembly may be integrally formed on the actuator. In an example embodiment, the vibration reduction assembly may be formed on an interface plate disposed at an interface between a housing of the actuator and the chassis.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An interface plate for operably coupling a vehicle component to a chassis of the vehicle, the interface plate comprising:
   a first surface adapted to be operably coupled to an actuator housing;
   a second surface adapted to be operably coupled to the chassis; and
   a vibration reduction assembly to reduce vibration propagation between the actuator housing and the chassis, the vibration reduction assembly comprising:
   a first retaining channel disposed in the first surface; and
   a first wire rope comprising a plurality of strands disposed within the first retaining channel,
   wherein the actuator housing is an electronic brake boost housing, and
   wherein the interface plate is integrally formed on an end of the electronic brake boost housing.

2. The interface plate of claim 1, wherein a second retaining channel is disposed in the first surface,
   wherein a second wire rope is disposed within the second retaining channel, and
   wherein the second wire rope comprises strands.

3. The interface plate of claim 2, wherein the first and second retaining channels are linear in shape and parallel to each other.

4. The interface plate of claim 2, wherein the first and second retaining channels are arcuate in shape and equidistant from each other.

5. The interface plate of claim 1, wherein the interface plate further comprises a component orifice extending through the interface plate from the first surface to the second surface,
   wherein the first retaining channel is disposed proximate to an outer edge of the first surface of the interface plate and the second retaining channel is disposed proximate to the component orifice at an inner edge of the interface plate.

6. The interface plate of claim 1, wherein the first retaining channel has a width approximately equal to a diameter of the first wire rope.

7. The interface plate of claim 1, wherein the strands of the first wire rope are bound together in a parallel configuration.

8. The interface plate of claim 1, wherein the strands of the first wire rope are bound together in a twisted configuration.

9. The interface plate of claim 1, wherein the interface plate is a separate component operably coupled to the electronic brake boost housing and the chassis at an interface between the electronic brake boost housing and the chassis.

10. A vibration reduction assembly, the vibration reduction assembly comprising:
    a first wire rope disposed in a first retaining channel; and
    a second wire rope disposed in a second retaining channel,
    wherein the first and second wire ropes comprise strands, and
    wherein the strands dissipate vibrations through friction damping,
    wherein the first and second wire ropes are disposed between an actuator and a chassis of a vehicle to reduce the propagation of vibrations between the chassis and the actuator, and
    wherein the vibration reduction assembly is integrally formed on the actuator.

11. The vibration reduction assembly of claim 10, wherein the first and second retaining channels each have a width approximately equal to a diameter of the first and second wire ropes, respectively.

12. The vibration reduction assembly of claim 10, wherein the first and second retaining channels are linear in shape and parallel to each other.

13. The vibration reduction assembly of claim 10, wherein the first and second retaining channels are arcuate in shape and equidistant from each other.

14. The vibration reduction assembly of claim 10, wherein the strands in the first and second wire ropes are bound together in a parallel configuration.

15. The vibration reduction assembly of claim 10, wherein the strands in the first and second wire ropes are bound together in a twisted configuration.

16. The vibration reduction assembly of claim 10, wherein the vibration reduction assembly is formed on an interface plate disposed at an interface between a housing of the actuator and the chassis.

17. An interface plate for operably coupling a vehicle component to a chassis of the vehicle, the interface plate comprising:
    a first surface adapted to be operably coupled to an actuator housing;
    a second surface adapted to be operably coupled to the chassis; and
    a vibration reduction assembly to reduce vibration propagation between the actuator housing and the chassis, the vibration reduction assembly comprising:
    a first retaining channel disposed in the first surface, the first retaining channel having a first retaining channel volume; and
    a first wire rope comprising a plurality of strands disposed within the first retaining channel, the first wire rope having a first wire rope volume,
    wherein the first retaining channel volume exceeds the first wire rope volume by approximately 10-20%,
    wherein the actuator housing is an electronic brake boost housing, and
    wherein the interface plate is integrally formed on an end of the electronic brake boost housing.

18. The interface plate of claim 17, wherein the first retaining channel is open at the first surface and the actuator housing compresses the first wire rope into the first retaining channel below the first surface responsive to the actuator housing being operably coupled to the first surface.

* * * * *